Dec. 30, 1969  R. D. COREY  3,486,774
PIPING
Filed Oct. 24, 1967  2 Sheets-Sheet 1
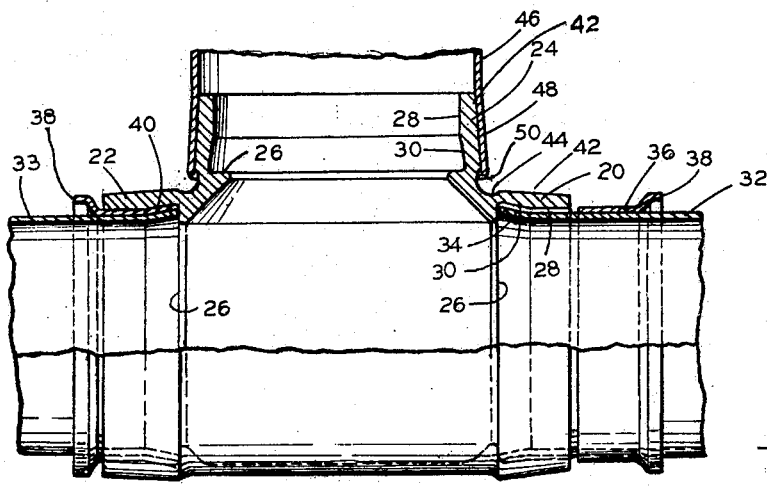
FIG.1
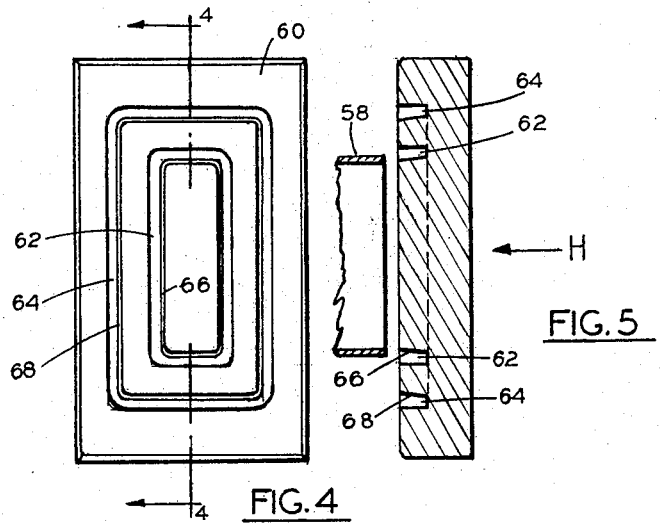
FIG.4
FIG.5
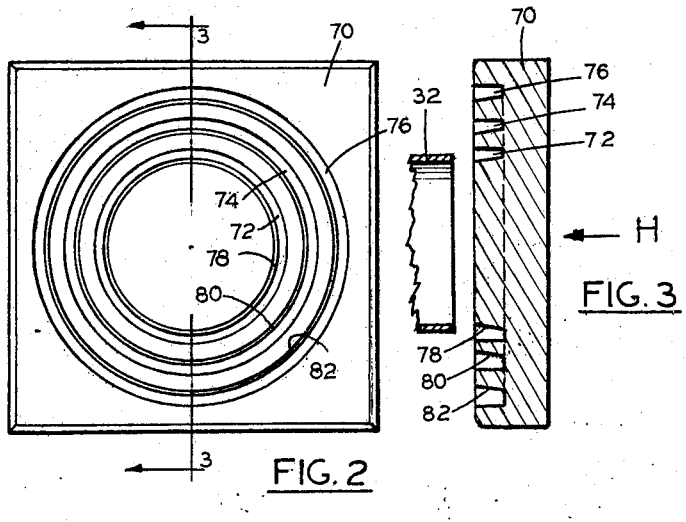
FIG.2
FIG.3
INVENTOR
RONALD D. COREY.
BY
ATTORNEY

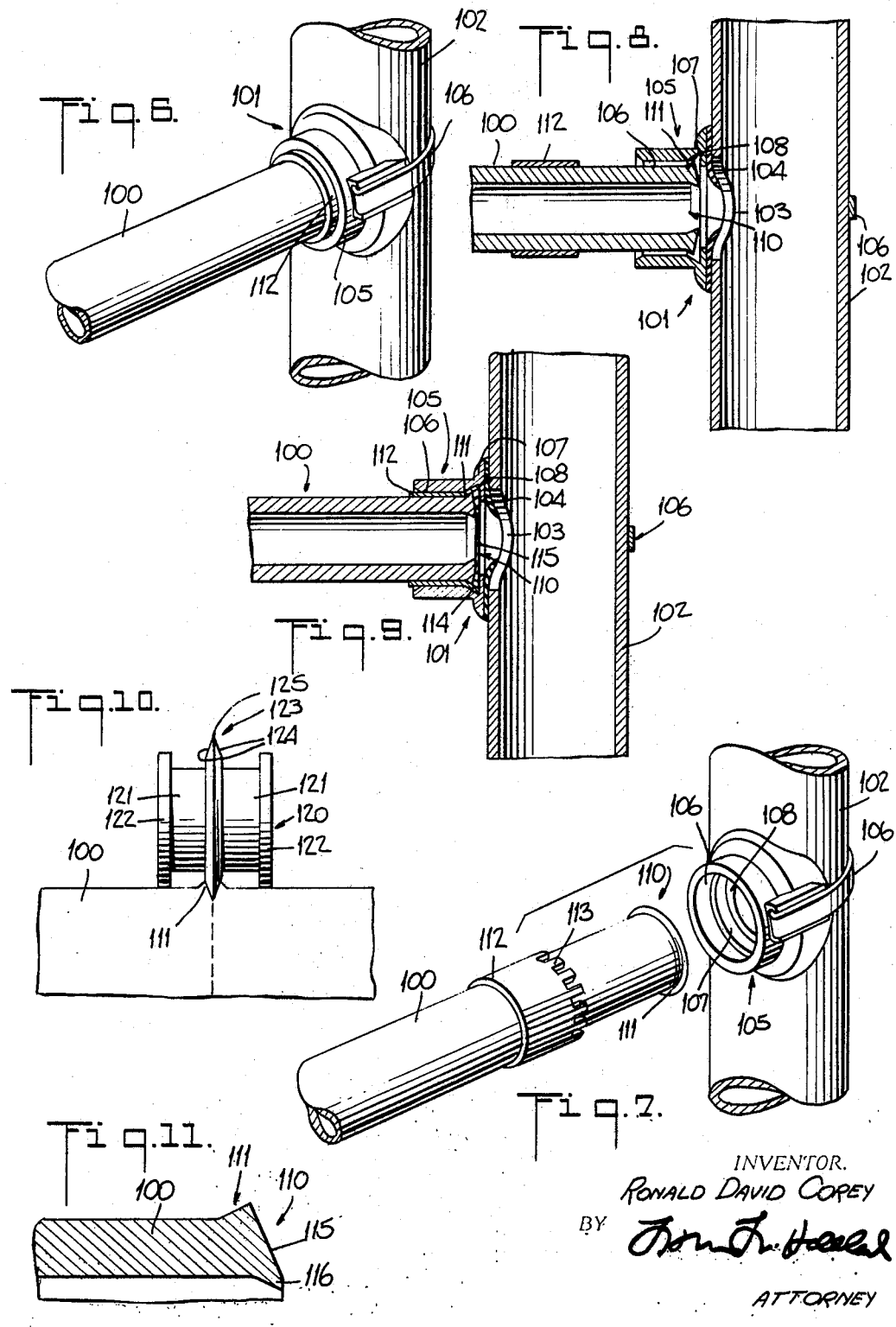

United States Patent Office 3,486,774
Patented Dec. 30, 1969

3,486,774
PIPING
Ronald David Corey, R.D. 1, Box 293,
Chenango Forks, N.Y. 13746
Continuation-in-part of application Ser. No. 472,499,
July 16, 1965. This application Oct. 24, 1967, Ser.
No. 684,887
Int. Cl. F16l 25/00, 35/00
U.S. Cl. 285—334.5                                        9 Claims

ABSTRACT OF THE DISCLOSURE

The present invention is directed to a pipe joint whereby a pipe having a flared end is positioned within a fitting having a bore and a flared cavity. A drive sleeve is positioned between the fitting and the pipe to complete the joint.

CROSS REFERENCES

The present application is a continuation-in-part of pending United States patent application Ser. No. 472,499, filed July 16, 1965, for "Piping," and now abandoned.

BRIEF SUMMARY OF INVENTION

This invention relates to piping and more particularly to a method of joining pipe sections and pipe fittings with a minimum of waste and effort.

The coupling of steel pipes, especially of large diameter, has usually been effected by applying a tapered male pipe thread to the pipe end, and threading the same into a fitting having a corresponding female thread. While other systems, involving flanges, welding and the like, are employed, the use of threaded connections has persisted. Applying thread to the pipe weakens the pipe by reducing its thickness by more than a half in a standard pipe thread. Hence the wall of the pipe must be nearly double the thickness of the maximum depth of the thread. Thus the wall of the pipe is double the thickness that would otherwise be necessary along its entire length, in order to provide sufficient thickness for applying a pipe thread at the ends.

Threaded joints require relative rotation during assembly, and the active length of a section pipe, once threaded into fittings is difficult to predict since it cannot be ascertained readily how far the pipe end must be threaded into the pipe fitting before the pipe joint is tight. Thus accurate layouts require skill to achieve and due to the threaded connection frequent expensive unions are required.

Furthermore, in using threaded pipe, raw metal is exposed outside of the joint so that it is subject to attack by rust. In addition, threaded pipe is substantially more expensive than pipe that is not threaded.

The present invention is directed to a system of piping that does away with pipe threads, whereby light wall pipe, having a wall thickness approximately one-half that necessitated by threaded pipes may be used and coupled through unthreaded fittings by a relatively simple procedure, readily performed in the field. The invention further has to do with joining relatively thin wall pipe with fittings through the use of a flared pipe end, and flared outlets in pipe fittings to receive the pipe end and a locking sleeve that may be driven along the pipe end and into the pipe fitting outlet, the band being upset and flared in the process and forming a lock between pipe end and the fitting.

One of the objects of the present invention is the provision of an improved threadless pipe and fitting therefor.

Another object of the present invention is the provision of an improved method of forming pipe joints which can be used with either relatively heavy wall pipe or light wall pipe.

Another object of the present invention is the provision of an improved threadless fitting in which expensive pipe threading tools are eliminated.

Another object of the present invention is the provision of an improved cutting instrument which not only will cut pipe but at the same time will automatically prepare the pipe for use as a threadless fitting.

Another object of the present invention is the provision of a pipe fitting which permits light wall pipe to be used so that the wall thickness is reduced, the weight is reduced, the cost of materials and installation is reduced and the pipe capacity is increased.

Another object of the present invention is the provision of an improved pipe fitting in which the installer may purchase pipe in mixed shipments at lower cost.

Another object of the present invention is the provision of an improved method of forming threadless pipe.

Other and further objects of the invention will be obvious upon an understanding of the illustrative embodiment about to be described, or will be indicated in the appended claims, and various advantages not referred to herein will occur to one skilled in the art upon employment of the invention in practice.

BRIEF DESCRIPTION OF SEVERAL VIEWS

A preferred embodiment of the invention has been chosen for purposes of illustration and description and is shown in the accompanying drawings, forming a part of the specification, wherein:

FIG. 1 is a side elevation with the upper half in section of a pipe fitting and pipe connection thereto;

FIG. 2 is a die for flaring circular pipe;

FIG. 3 is a section on the line 3—3 of FIG. 2;

FIG. 4 is a die for flaring rectangular section pipe;

FIG. 5 is a section taken on the line 5—5 of FIG. 4;

FIG. 6 is a perspective view of another embodiment in the present invention;

FIG. 7 is an exploded perspective view of the invention showing the position of the parts before assembly;

FIG. 8 is a sectional view showing the position of the parts before assembly;

FIG. 9 is a sectional view showing the position of the parts after assembly;

FIG. 10 is an elevational view showing improved cutter wheel for forming the pipe of the present invention; and FIG. 11 is an enlarged fragmentary sectional view of a pipe made in accordance with the present invention.

DETAILED DESCRIPTION

In FIG. 1 there is shown a T having outlets 20, 22 and 24 all of which are alike in size and shape for the purposes of illustration. The outlet 20 has a cylindrical bore 28, a taper 30 leading to an annular shoulder 26. The thin wall pipe 32 has been flared as at 34, before insertion into the outlet 20. Prior to flaring, a circular sleeve 36 is slid on the pipe end, and the thickness of the metal of the sleeve is such as to freely slide along the external surface of the pipe and slide into the cylindrical bore 28 of the outlet 20. Such ring or sleeve 36 may have an annular driving offset to facilitate applying suitable tools to the sleeve so as to slide the same along the pipe and into the pipe outlet.

As shown at outlet 20, the pipe 32 is in position for completing the coupling operation, the pipe end being against the shoulder 26. To secure the pipe end within the outlet 20, the sleeve 32 is driven along the pipe by blows of a hammer applied directly to the driving offset 38, or through a sleeve drive iron until the sleeve takes the position as indicated by the sleeve 40 in outlet 22. The pipe flare 34 causes the sleeve to flare outwardly into the taper 30 of the outlet and when driven home as shown at 40, the pipe 33 is locked in place and cannot be separated from the fitting.

Assuming the pipe 32 is light wall pipe having an outside diameter of 3½ inches, and an inside diameter of 3¼ inches, and a wall thickness of 0.125 inch, the diameter of the cylindrical bore portion of the T outlet would be 3.687 inches and about 9/16 inch long. The taper portion may be a half inch long and the diameter at the shoulder 26 would be about 3.8125 inches, or a radial increase of about .112 inch in a half inch of axial length. The thickness of the metal of which the drive sleeve is composed will be preferably somewhat under one half the difference between the outside diameter of the pipe and the internal diameter of the cylindrical bore 28 of the outlet, or about .093 inch thick or a little under.

In FIG. 1 it will be seen that the external surface of each outlet is tapered as at 42 along the length. In practice the taper may increase from 4.2334 inches diameter to about 4.312 inches and the length of the taper may be in the order of about 1.1875 inches. The large diameter end of the taper is abruptly ended by an annular groove 44. By selecting the dimensions set forth above any one of the outlets may receive the next larger size of the light wall pipe by applying the pipe end externally over the outlet instead of internally as in the case of 3½ inch pipe.

In FIG. 1, a 4½ inch outside diameter pipe 46 having an inside diameter of 4¼ inch is shown driven on the taper surface 42 of the outlet 24. It will be observed that the pipe in being driven upon the taper surface 42 of outlet 24, has been caused to flare as at 48. By driving the pipe end beyond the taper surface so as to overhang the annular groove 44 the pipe end can be headed over as at 50 by the blows of a hammer either directly applied or through a suitable heading over tool. If desired to facilitate assembly of the pipe 46 the pipe end may be preflared before being driven upon the taper surface 42 but preferably such preflare should be a little less than that ultimately formed by applying the pipe end to the fitting in order to assure a tight fit.

The formation of a suitable flare upon the pipe ends for use in coupling pipes to fittings of the type herein described may be effected through the use of a hardened steel die, such as 70, in which are provided one or more annular grooves such as 72, 74 and 76, each one for a different standard pipe size. The inside wall of each of said grooves will be tapered as at 78, 80 and 82, and the minimum diameter of the tapered wall, will be just under the inside diameter of the pipe to which it is suited, to facilitate projecting the pipe end slightly into the annular groove. Thereafter, by driving the die onto the pipe end in the direction of arrow H, by blows of a heavy hammer the pipe end is caused to be upset and formed into a flare of correct shape, as it rides up the taper wall, for example 78 of the die 70. Any suitable laterally extending handle, not shown, may be applied to the die.

The system of coupling light wall pipes is equally applicable to round or rectangular sectioned pipe and while the fitting shown in FIG. 1 is for round pipe the outlets may be of rectangular or other contour as desired but a section through the outlet as is shown in FIG. 1 would be approximately the same.

In order to flare rectangular sectioned pipe for assembly in fittings having corresponding rectangular outlets a die as shown in FIGS. 4 and 5 may be employed. The die 60 has grooves 62 and 64 for receiving two different sizes of rectangular sectioned pipe, one size being shown in FIG. 5 at 48. The inclined wall 66 of groove 62 is adapted to accurately flare the end of pipe 58 when the die is applied to the end of the pipe 58 and driven home in the direction of arrow H, the tapered wall 66 causing the end of the pipe 58 to be upset and accurately flared. Similarly, the tapered wall 68 of groove 64 will accurately flare a pipe of larger size.

When assembling rectangular section pipe, the sleeve for locking the pipe end into the outlet fitting will likewise be a sleeve of corresponding shape to closely embrace the end of the pipe prior to forming a flare and to slide into the fitting outlet which will have dimensions just enough greater than the pipe to receive the sleeve, the operation being the same as previously described, whether round or polygonal section pipe and fittings be employed. While circular or annular bands or sleeves in one continuous piece may be preferred, bands with ends abutting or feathered may be employed and any joint sealing material may be employed if desired.

The use of a T as shown in FIG. 1, for illustration, wherein all outlets 20, 22 and 24 are alike and circular, has made it convenient to illustrate the two stages in coupling a pipe to the inside bore of an outlet and to illustrate the manner in which an outlet may be employed for coupling to a pipe of the next larger nominal size. In practice a T as shown, elbows, reducers, couplings and all forms of fittings may be provided, the invention being centered on the method of joining pipe either within or exteriorly of a pipe fitting outlet having a longitudinal section configuration substantially as shown in FIG. 1. Such fittings may have a combination of an outlet or outlets for rectangular or oval section pipe in combination with outlets for circular section pipe and the outlets may be varied in size. The invention further contemplates an outlet adapted for placement over a pipe sidewall aperture, in saddlelike fashion, since with light wall pipe the cutting of side apertures to provide for a branch is facilitated by reason of the thinness of the pipe wall. In practice, the rectangular section pipe may be in the form of base board heater pipe through which hot gases travel.

Referring now to the embodiment shown in FIGS. 6 through 11, the pipe 100 is shown used with a saddle joint 101 comprising a saddle pipe 102 havng an opening 103 (formed therein in any desired manner), a gasket 104 and a saddle fitting or hub 105. A strap 106 is adapted to hold the assembly in place. It will be understood that the embodiment about to be described may also be used in forming a joint with the T in the embodiment shown in FIGS. 1 through 5. The fitting or hub 105 is provided with a cylindrical bore 106 communicating with an outwardly tapered zone 107 which terminates in a shoulder 108. The length of the tapered zone 107 is less than the overall length of the fitting bore 106.

The pipe 100 shown in the drawing is thicker walled pipe, such as Schedule 40 pipe, however, it will be understood, that the invention will also be applicable for use with thin walled pipe similar to the thin walled pipe shown in FIGS. 1 through 5.

The end 110 of the pipe 100 has a circumferential upstanding tapered flare or burr 111 at forward end. The flare 111 generally corresponds in shape to the tapered zone 107 in the fitting bore 106. The length of flare 111 is short and is confined to the area of the pipe immediately adjacent the end edge 115 of the pipe 100 and does not extend for any appreciable length.

A drive sleeve 112 is mounted on the pipe 100 behind the flare 111. The drive sleeve 112 is unslotted throughout its length and it may have short teeth 113 at its forward end, as shown in FIG. 7 or have no teeth as shown in the embodiment of FIGS. 1 to 5.

The pipe 100 is inserted into the bore 106 in the fitting 105. The opening 106 of the fitting 105 has a diameter at least as great as the largest diameter of the flare 111 so that the pipe 100 can be inserted therein. The pipe 100 is inserted into the pipe fitting until the forward end strikes the shoulder 108.

The drive sleeve 112 is then forced inwardly by hammering or otherwise, until its forward end strikes the flared portion 111 of the pipe 100. The forward part of the drive sleeve 112 starts to flare or bend outwardly as at 114 because it strikes and follows the outward contour of the flare 111. In bending or flaring, drive sleeve forms a tight fit between the sleeve 112, the bore 106 and the pipe 100. Its forward movement will be stopped by shoulder 108. If the sleeve 112 is provided with teeth 113, as shown in FIG. 7, the teeth 113 will flare or be bent outwardly. The drive sleeve 112 is made of a material which is softer than the material of the pipe 100 so that it may easily be flared or bent to conform to the flare 111.

If desired, the spaced formed by the flare 107 and shoulder 108 of the fitting 105 may be filled with a sealing compound 115, such as a silicone cement, prior to assembly, so that when assembled the compound 115 is squeezed over the end of the pipe to seal the joint when it hardens.

The improved method of forming the flare 111 on pipe 100 is shown in FIG. 10. A cutter wheel 120 is provided with a knife, a body portion 121 extending from either side of the knife 123. A pair of spacer wheels 122 are mounted at the ends of body portion 121. The knife 123 comprises a pair of tapered faces 124 on either side of a cutting apex 125. When the cutter wheel 120 is mounted on the pipe 100, the spacer wheels 122 abut the pipe and provide a space between the body portion 121 and the pipe 100. The knife 123 digs into the pipe 100 and the tapered faces 124 of the knife will push the excess pipe material that is displaced outwardly to form a burr or flare 111 on the outside of the pipe adjacent the end edge 115. Since the body portions 121 are spaced from the pipe, the flare or burr 111 will not be flattened out so that a permanent flare 111 is formed.

The end edge 115 of the pipe will be slightly tapered and a slight inner burr 116 will also be formed. As the cutter 120 is moved around the pipe 100 the burring and flaring operation will be substantially uniform around the edge of the pipe. Thus, the cutting and flared operations are combined into a single simultaneous step. This method is applicable to both thin wall and thicker wall pipe.

It will thus be seen that the present invention provides an improved threadless pipe and fitting and a pipe joint which can be used with either heavier wall pipe or light wall pipe without the necessity for expensive threading tools. The invention also provides an improved cutting instrument which not only will cut pipe but at the same time will simultaneously prepare the pipe to be used as a threadless fitting.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A pipe joint comprising a pipe fitting having an outlet to receive a pipe end, said outlet having an inwardly facing threadless cylindrical wall extending axially inwardly from the end of the outlet and merging into a conical wall of gradually increasing diameter, and a pipe having a threadless end flared outwardly disposed within said outlet, with the flared end disposed radially opposite the conical wall, and an annular sleeve disposed about and closely embracing the pipe end and slidingly fitted within the outlet and of a length at least as great as the combined length of the cylindrical and conical wall, said sleeve being circumferentially continuous and unslotted throughout the greater part of its length, said sleeve being of a material softer than said pipe and said outlet and having its inner portion upset and flared outwardly to a diameter greater than the diameter of the cylindrical wall.

2. A pipe joint comprising a pipe fitting having an outlet to receive a pipe end, said outlet having an inwardly facing annular threadless wall extending axially inwardly from the end of the outlet, and merging into a tapered wall of gradually increasing diameter, and a pipe having a threadless end of similar shape to that of the annular wall and having an end flared outwardly, disposed within said outlet, with the flared end disposed opposite the tapered wall, and an annular sleeve disposed about and closely embracing the pipe end and slidingly fitted within the outlet and of a length at least as great as the combined length of the annular and tapered wall, said sleeve being circumferentially continuous and unslotted throughout the greater part of its length, said sleeve being of a material softer than said pipe and said outlet and having its inner portion upset and flared outwardly to a dimension greater than the dimension of the annular wall.

3. A pipe joint comprising a pipe and a fitting, said pipe having a wall portion and an end edge, a threadless outwardly flared flange adjacent to the end edge, said flange being confined to the area immediately adjacent the end edge, said fitting having a threadless bore receiving said pipe and an outwardly flared cavity communicating with said bore and receiving the flange of said pipe, a drive sleeve interposed between said fitting and said pipe wall, said drive sleeve being circumferentially continuous and unslotted throughout the greater part of its length and being of a material softer than said pipe and said fitting, the forward end of said drive sleeve being bent outwardly to conform to the shape of the flange in said pipe and the flared cavity in said fitting.

4. A pipe joint as claimed in claim 3 wherein a stop is provided at the forward end of the flared cavity in said fitting.

5. A pipe joint as claimed in claim 3 wherein the length of said flared cavity is smaller than the length of said fitting bore.

6. A pipe joint as claimed in claim 3 wherein the forward end of said drive sleeve is toothed.

7. A pipe joint as claimed in claim 3 wherein a sealing compound is interposed between the fitting and the pipe to form a seal.

8. A pipe joint as claimed in claim 3 wherein the entire thickness of the wall portion of the pipe is flanged outwardly.

9. A pipe joint as claimed in claim 3 wherein the outer surface only of said pipe wall is flanged outwardly.

References Cited

UNITED STATES PATENTS

| 579,817 | 3/1897 | Connelly | 285—334.5 |
|---|---|---|---|
| 826,154 | 7/1906 | Doolittle | 285—382.7 |
| 1,507,138 | 9/1924 | Pierce | 285—334.5 |
| 2,112,673 | 3/1938 | Lewis | 285—382.1 X |
| 2,125,552 | 8/1938 | Feldhoff | 287—114 X |
| 2,453,127 | 11/1948 | Guarnaschelli | 285—334.5 X |
| 3,092,405 | 6/1963 | Wurzburger | 285—382.7 X |

FOREIGN PATENTS

| 145,190 | 7/1920 | Great Britain. |
|---|---|---|
| 436,041 | 10/1935 | Great Britain. |
| 410,268 | 4/1945 | Italy. |

DAVID J. WILLIAMOWSKY, Primary Examiner

DAVE W. AROLA, Assistant Examiner

U.S. Cl. X.R.

285—156, 197, 363, 382